W. P. KEENE.
LEDGER SHEET.
APPLICATION FILED APR. 17, 1919.

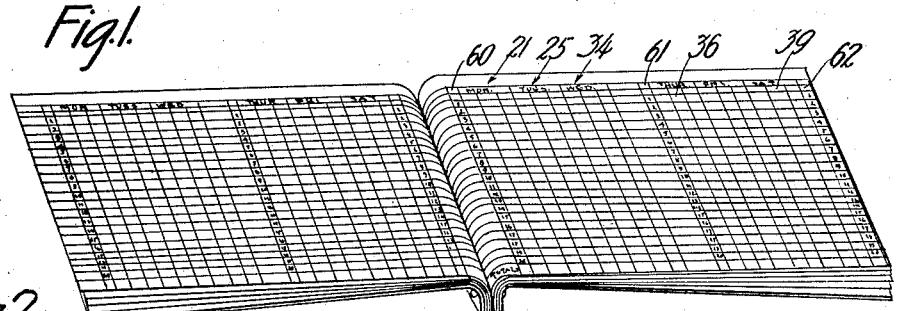

1,357,458.

Patented Nov. 2, 1920.
2 SHEETS—SHEET 2.

UNITED STATES PATENT OFFICE.

WENDELL P. KEENE, OF BROOKLYN, NEW YORK, ASSIGNOR TO UNDERWOOD TYPEWRITER COMPANY, OF NEW YORK, N. Y., A CORPORATION OF DELAWARE.

LEDGER-SHEET.

1,357,458.  Specification of Letters Patent.  Patented Nov. 2, 1920.

Application filed April 17, 1919. Serial No. 290,844.

*To all whom it may concern:*

Be it known that I, WENDELL P. KEENE, a citizen of the United States, residing in Brooklyn borough, in the county of Kings, city and State of New York, have invented certain new and useful Improvements in Ledger-Sheets, of which the following is a specification.

This invention relates to bookkeeping devices, especially such as are adapted to be used for bank bookkeeping, and is herein illustrated and described as applied to a loose-leaf "Boston" ledger, especially adapted to be used in connection with an Underwood standard bookkeeping machine. One form of the machine embodying three registers is shown in the patent to Hoyt, 1,280,228, though according to the present disclosure only two registers need be employed.

"Boston" ledgers comprise sheets which have a horizontal ruling to divide them into spaces, so that there is one horizontal space between the lines of ruling for each account on the ledger. These ledgers are also provided with vertical rulings to divide the horizontal spaces into columns for days, a column or columns for names, and other minor columns. Each day column is usually further divided into other columns, herein shown as three subsidiary columns, one to receive checks (charges) and deposits (credits), one to receive the daily balance, and one for a pick-up column for use in computing the daily balance-column entries.

Since each subsidiary column has to receive an entry or a daily balance, which may be of considerable magnitude, a weekly sheet with all these ruled columns on it is of considerable width, perhaps running up to even 36 inches. Work-sheets of this width are not only awkward to handle, but are also difficult to adjust accurately and rapidly around the platen of a typewriting machine, the flexibility adding to the awkwardness of handling a sheet of such width. Moreover, a typewriting or other computing machine, having a carriage sufficiently long to accommodate a work-sheet of this width, is awkward and noisy in operation and requires a great deal of space to permit the travel of the carriage, besides being expensive to build.

According to the present invention, loose-leaf sheets of such ledgers may be so foldable as to bring them within the limits of a typewriter carriage of reasonable width when folded. Although the folding of the sheet necessarily results in covering up some of the columns, I have found it possible, by having the names of the customers printed twice, (herein shown both at one edge and at the middle of the sheet), to so arrange the columns on the sheet, with reference to the folds, that neither the name column nor the entry column, adjoining the one in use, need be covered up by such folding, thus facilitating the making of entries. Moreover, I have found it possible to so design the sheet that each margin may be folded over in order to receive a carbon copy of the last column on the sheet, thus enabling the margin to be utilized as a memorandum for transferring the accounts to the new sheet, or to the opposite side of the sheet in case that is the next to be used. The margins may be perforated, if desired, so that they may be readily detached at will, thus reducing the size of the ledger sheet as kept for permanent record. The folding over of the margins in itself reduces the size of the sheet sufficiently to considerably facilitate handling it and accommodating it to some sizes of machines.

I have found it possible to so place these folds and detachable margins that the sheet, when folded, may be brought down to half its length no matter at which point it needs to be folded, with the result that it can be placed in a typewriter carriage of comparatively short length. I have also been able to so place the folds that no folded part need be three thicknesses thick where written upon, unless the margin, used for making the carbon copy of Saturday's work, is being written upon. I have been able to accomplish this reduction in size in one preferred embodiment, with only two points of folding between the detachable margins.

Other features and advantages will hereinafter appear.

In the accompanying drawings,

Figure 1 is a perspective view of an open ledger comprising sheets embodying the present invention, the detachable margins being out of sight.

Fig. 2 is a face view, showing one face of a ledger sheet removed from the ledger with the detachable margins opened out to show them.

Fig. 3 is a face view, showing the other face of the sheet seen in Fig. 2.

Fig. 4 is a perspective view of a platen with a folded ledger sheet passing around it, as it would appear on Wednesday at the beginning of business for that day.

Fig. 5 is a face view of the sheet folded as seen in Fig. 4.

Fig. 6 is a face view of the sheet folded for the last half of the week and showing the entries at the beginning of business on Saturday.

Fig. 7 is a face view of a detached margin, showing the carbon copy of Saturday's entries for use in preparing the entries for Monday.

Fig. 8 is a view similar to Fig. 5, except that it shows the other face of the sheet with the margins still attached and one opened out showing the entries on it.

Fig. 9 is a view of the face of the sheet seen in Fig. 8, but showing the sheet folded and the carbon inserted for writing the Saturday entries upon the detachable margin.

Fig. 10 is a face view, showing a fragment of the face of a sheet, as seen in Fig. 1, with the Saturday margin copy detached and placed alongside of it for copying off.

In beginning a new sheet, as for example in copying from an old-style hand-written ledger, a sheet is passed around the platen of a typewriting machine, as shown in Fig. 4, and the daily balance of $250.75 is inserted in the "daily balance" subsidiary column 20 of a major or Monday's column 21. This insertion is usually printed in green ink and may be effected by having the typewriter ribbon divided, with a green stretch at one end, so that digits or other characters written by the types with that end of the ribbon will print green. In practice, as will appear later on, the daily balances in green ink are usually written in column 20 for all the accounts at one time, that is, on every line in column 20.

The next entries, shown in Figs. 4 and 5, represent the entries which are made when a check or checks come to the typist's desk, representing a total withdrawal of $75.00 by John Doe. Preparatory to entering such a withdrawal, the typist passes the sheet around the platen, folded as shown in Fig. 4, and brings the pick-up balance column 22 to the printing point, and copies out in said column opposite the name John Doe the daily balance $250.75, shown in column 21, writing this in black ink and adding this amount into a "computation" register, as one of the registers is called in some types of Underwood bookkeeping machines.

Then the typist shifts the carriage to write in column 23 and enters in that column in red the check or checks amounting to $75.00, mentioned above, the platen having been line-spaced between writing. This item of $75.00 is simultaneously subtracted both from the "computation" register, mentioned above, and from the "footing" register, as the other register is called in some types of Underwood bookkeeping machines. This brings the "computation" register to display the difference between the balance $250.75 and the withdrawal of $75.00, namely, $175.75. The typist copies in black this amount from the "computation" register into column 21, while subtracting it from the "computation" register, thus bringing that register to zero.

In order to prove the accuracy of the work after copying the item $175.75 from the "computation" register, the typist prints the usual star by actuating the usual clearance-proving key, found in the commercial Underwood standard adding machines. This star and the item are typed in black, thus showing clearly that the entry is of a different nature from that of the daily balance carried over from the previous day, which is described above and is entered in green.

In making entries on the various work-sheets, it is customary for the typist to have the items so sorted that during a substantial part of a day, or of an hour in the day, only withdrawals are entered, and that during the remainder of the day, or the remainder of an hour, only credits or deposits are entered, thus minimizing the likelihood of entering a withdrawal as a credit or the reverse. For this reason, the accounts, even if active, ordinarily show only one withdrawal entry and one deposit entry made each day, unless withdrawals or deposits in the same account are made at widely separated intervals during the day.

For this reason usually the next entry by the typist on the John Doe account would be a deposit, herein illustrated as a deposit of $125.50. Preparatory to entering the deposits, the typist passes the work-sheet around the platen, folded as shown in Fig. 4, and writes in the pick-up column 22 the last balance shown in the daily balance column, viz., $175.75, adding that balance into the "computation" register and writing it in black. Then the typist line-spaces the platen and writes in black column 23 the deposit amount $125.50, adding that amount both in the "footing" register and the "computation" register, causing the "computation" register to display the amount $301.25. The typist now copies this amount in column 21 in black, subtracting it from the computation register, thus bringing that register to zero; and then actuates the usual clearance-proving key to print the usual star, thus proving the accuracy of copying from that register. On the sheet shown in Figs. 4 and 5, no further entries were made that day in the Monday column.

At the close of business for the day, to prove the books and also to open the books for the next day, the typist inserts the sheets one after another to copy out in green ink in the daily balance column 24 for Tuesday the last daily balance of each account on Monday, as shown in the column 21. This may be done in another machine, or the aforesaid "footing" register may be first brought to zero by subtracting out of the day's total, shown therein, while copying it on a "control" sheet, not shown herein. If all the balances have been correctly copied in the Tuesday column 25, and all the entries under Monday have been correctly made, the totals on the "control" sheet, when combined with the various tellers' totals, will balance with the daily balance total obtained by footing all the items copied into column 25 at this time.

As illustrated in Figs. 4 and 5, the only active account is that of John Doe, and that is illustrated as being active on Monday only, with the result that all the other accounts show an identical balance on all the other days of the week, and there is only the single daily balance entry under each day.

In making the entries for Monday, Tuesday and Wednesday up to the close of business on Wednesday, the loose-leaf sheets are inserted in the machine, as seen in Fig. 4, being folded over at fold lines 26 and 27, and then passed around the platen 28, so that the short flap 29 adjacent the binder openings 30 lie behind the "name" column 31. This brings the section 32 of the worksheet for the last half of the week behind the second "name" column 33, and behind the Monday column 21, the Tuesday column 25 and the Wednesday column 34. To enable the books to be readily closed Wednesday night and made ready for the opening of business on Thursday, the sheet is adapted to be folded along the folds line 35, falling between the daily balance column 46 and the checks-deposits column 46ª of Wednesday. This folding makes the Wednesday daily balance column 46 visible as well as the daily balance column 36 of Thursday, the other subsidiary columns of Thursday, and the corresponding columns of Friday and Saturday, as shown in Fig. 6.

When the sheet is folded for writing in the Thursday, Friday and Saturday columns, the fold 35 lies precisely in the middle of the sheet, with the result that the sheet, when folded, need only be two thicknesses thick, except on Saturday. While making all entries in Saturday columns, the narrow flap 38 is advantageously folded back and a carbon sheet 37 inserted between it and the face of the sheet, so that the flap 38 will receive impressions of all the entries in the daily balance column 39 of Saturday, said entries being shown in Fig. 7 at column 40.

At the close of business on Saturday, the final daily balances of Saturday are copied into the Monday daily balance column 44, the sheet for this purpose being folded as shown in Fig. 8, backwardly, along the fold 35, thus bringing the opposite side of the sheet out. This brings the flap 38 to such a position that it can lie flat on the face of the typewriter platen to permit the items of its transfer column to be copied directly into the Monday daily balance column 44. All entries in Monday, Tuesday and Wednesday columns of this week are made with the sheet folded thus. At the close of business Wednesday night, and for the purpose of getting the books ready for the opening of business on Thursday, the sheet is folded with the same side out along the fold 27, as shown in Fig. 9, thus bringing the Wednesday daily balance column 46 at the margin of the sheet adjacent the second "name" column 52, so that the opening daily balances for Thursday can be entered into the daily balance column 45 for Thursday. The sheet is folded the same way for making the entries up to the close of business on Friday and Saturday, there being provided a carbon sheet 47 to enable the entries in the Saturday daily balance column 48 to be copied onto the flap 29, as shown in column 49, Fig. 10. These carbon copy entries are used for entering the opening daily balances in the column 51 on the ledger sheet for the ensuing two weeks, shown in Fig. 10.

If desired, after the balances have been transferred from their transfer balance column 40, the flap 38 may be detached along the line 50 and discarded, thus bringing the sheet to the shape and size shown in Fig. 1, if the flap 29 is similarly discarded. It will be noted that there are two "name" columns 31 and 52 on the face seen in Figs. 3, 8 and 9, and that irrespective of the lines along which the sheet is folded, one central "name" column 33 or 52 is always in sight, depending on which face of the sheet is out. It will be observed that all lines of folding fall upon the lines of ruling between the columns, with the result that the entries never have any digit appear upon any fold line, thus enabling the digits to be clearly and distinctly imprinted and read.

In order to facilitate the rapid and accurate positioning of the detachable margins, and to guide the eyes of the typist in making entries, there is provided upon the side of the margin flap 38 near the balance column 40, a "line number" column 55 adapted to be alined with the "line number" columns 56 and 57, adjacent the "name" columns 31 and 52. To further guide the eyes of the typist, there is provided a "line number" column 58 adjacent the Saturday entries, as seen in Fig. 9. For the same purpose, there are provided "line number" columns 59, 60, 61 and 62 upon the flap 29, and upon the face of the sheet shown in Figs. 5 and 6.

It will be observed that in folding the sheet to place the same in a typewriting machine, the sheet is brought down to half its width, in Figs. 4, 5, 8 and 9, and that the folds, as shown in these figures, only make the sheet of double thickness when placed in the typewriting machine. The only time that the sheet needs to pass around the platen folded in triple thickness is when used to make the carbon copy for Saturday on one side of the sheet, the folds for doing this being shown in Fig. 6. Even the triple thickness, shown at 29 in said Fig. 6 is only used on one of the Saturdays for which the sheet is designed, and, if desired, the typist can fold the sheet so that even the triple thickness written on at that time is eliminated, although this may require, according to the present disclosure, another line of folding.

The clearing of the "footing" register at the close of the day's transactions, preparatory to closing the books for the day, includes entering the total shown on the "footing" register upon a "control" sheet, and, at the same time, subtracting the total from that "footing" register.

Variations may be resorted to within the scope of the invention, and portions of the improvements may be used without others.

Having thus described my invention, I claim:

1. A ledger sheet for a computing and printing machine, but wider than the platen thereof, and comprising a plurality of vertical columns, said columns including a name column and a plurality of amount columns, so that names and amounts can be entered opposite each other horizontally, and fold lines lying upon the divisions between columns, said sheet adapted to be folded along said lines to fit on the platen, so that entries in a name column will be visible irrespective of the way folded, and amount entries can be typed opposite the names nearer one edge or the other of the sheet according to the fold line along which the sheet is folded.

2. A ledger sheet for a computing and printing machine, but wider than the platen thereof, and comprising a plurality of vertical columns, said columns including a name column and a plurality of amount columns, so that names and amounts can be entered opposite each other horizontally, fold lines lying upon the divisions between columns, said sheet adapted to be folded along said lines to fit on the platen, so that entries in a name column will be visible irrespective of the way folded, and amount entries can be typed opposite the names nearer one edge or the other of the sheet according to the fold line along which the sheet is folded, and an extension of one edge of the sheet adapted to be folded over to receive a carbon copy of the entries in the last column to enable those entries to be transferred.

3. A ledger sheet for a printing and computing machine, but wider than the platen thereof, and comprising a face having a name column printed thereon near one margin, and amount columns successively further from said name column, and fold lines lying between the columns and along which the sheet is adapted to be folded to a width to fit said platen, so that when folded to display the amount column adjacent the name column, a plurality of amount columns are visible, and when folded otherwise along certain of the same fold lines to display amount columns most remote from said name column, a right-hand column displayed by the first folding becomes a left-hand column visible at the second folding.

4. A ledger sheet for a printing and computing machine, but wider than the platen thereof, and comprising a face having a name column printed thereon near one margin, amount columns successively further from said name column, fold lines lying between the columns and along which the sheet is adapted to be folded to a width to fit said platen, so that when folded to display the amount column adjacent the name column, a plurality of amount columns are visible, and when folded otherwise along certain of the same fold lines to display the amount columns most remote from said name column, a right-hand column displayed by the first folding becomes a left-hand column visible at the second folding, and similar columns printed on the opposite face of said sheet and so arranged that when folded along the same fold lines to display said opposite face, the fold lines lie between columns and the sheet may be first folded to display a name column and a plurality of adjacent amount columns, and later folded to display the right-hand one of the last-named amount columns as a left-hand amount column of the remainder of the columns.

5. A ledger sheet for a printing and computing machine, but wider than the platen thereof, and comprising a face having a name column printed thereon near one margin, amount columns successively further from said name column, fold lines lying between the columns and along which the sheet is adapted to be folded to a width to fit said platen, so that when folded to display the amount columns adjacent the name column, a plurality of amount columns are visible, and when folded otherwise along certain of the same fold lines to display the amount columns most remote from said name column, the right-hand column displayed by the first folding becomes the left-hand column visible at the second folding, and a detachable extension of the edge of the sheet beyond the last amount column adapted to be folded over to receive a carbon copy of the entries in the last amount column.

6. A ledger sheet for a printing and computing machine, but wider than the platen thereof, and comprising a face having a name column printed thereon near one margin, amount columns successively further from said name column, fold lines lying between the columns and along which the sheet is adapted to be folded to a width to fit said platen, so that when folded to display the amount columns adjacent the name column, a plurality of amount columns are visible, and when folded otherwise along certain of the same fold lines to display amount columns most remote from said name column, a right-hand column displayed by the first folding becomes a left-hand column visible at the second folding, similar columns printed on the opposite face of said sheet and so arranged that when folded along the same fold lines to display said opposite face, the fold lines fall between columns and the sheet may be first folded to display a name column and a plurality of adjacent amount columns, and later folded to display the right-hand one of the last-named amount columns as the left-hand amount column of the remainder of the columns, and detachable extensions of edges of the sheet adapted to be folded over to receive carbon copies of the entries in the last amount columns.

7. A ledger sheet for a printing and computating machine, but wider than the platen thereof, and comprising a face having a name column, a plurality of amount columns in which latter columns entries are adapted to be typed opposite the names, a second name column for the same names and separated from the first name column by a plurality of said amount columns, and fold lines along which the sheet is adapted to be folded to a width to fit said platen, said fold lines lying between the columns, so that one name column and a plurality of adjacent amount columns are visible when the sheet is folded one way, said sheet also adapted to be folded otherwise along certain of said fold lines to display the other name column and a plurality of amount columns adjacent thereto including one of the previously-displayed amount columns.

8. A ledger sheet for a printing and computing machine, but wider than the platen thereof, and comprising a face having a name column, a plurality of amount columns in which latter columns entries are adapted to be typed opposite the names, a second name column for the same names and separated from the first name column by a plurality of amount columns, fold lines along which the sheet is adapted to be folded to a width to fit said platen, said fold lines lying between the columns, so that one name column and a plurality of adjacent amount columns are visible when the sheet is folded one way, said sheet also adapted to be folded otherwise along certain of said fold lines to display the other name column together with a plurality of amount columns adjacent thereto including one of the previously-displayed amount columns, and a detachable extension of the last-used edge of the sheet adapted to be folded over to receive a carbon copy of the last entries.

9. A ledger sheet for a printing and computing machine, but wider than the platen thereof, and comprising a face having a name column, a plurality of amount columns in which latter columns entries are adapted to be typed opposite the names, a second name column for the same names and separated from the first name column by a plurality of said amount columns, fold lines along which the sheet is adapted to be folded to a width to fit said platen, said fold lines lying between the columns, so that one name column and a plurality of amount columns are visible when the sheet is folded one way, said sheet also adapted to be folded otherwise along certain of said fold lines to display the other name column together with a plurality of amount columns adjacent thereto including one of the previously-displayed amount columns, a detachable extension adjacent one name column adapted to enter a loose-leaf binder, similar columns upon the other face of the sheet, grouped by folding along the same fold lines, and an extension beyond said first-named extension adapted to receive a carbon copy of entries written on the opposite face of the sheet.

10. A ledger sheet for a printing and computing machine, but wider than the platen thereof, and comprising a face having a name column, a plurality of major columns, and at least three subsidiary columns under each major column, each group of said subsidiary columns including an item column, a balance column, and a pick-up column; and comprising fold lines lying between the columns and along which the sheet is adapted to be folded to a width to fit said platen, so that the name column is visible, and comprising a second name column intermediate said major columns, said sheet also comprising another fold line between the columns to enable the sheet to be folded to display said second name column and a major column to one side thereof.

11. A ledger sheet for a printing and computing machine, but wider than the platen thereof, and comprising a face having a name column, a plurality of major columns, at least three subsidiary columns under each major column, each group of said subsidiary columns including an item column, a balance column, and a pick-up column; and comprising fold lines lying between the columns and along which the sheet is adapted to be folded to a width to fit said platen, so that the name column is visible, and comprising a second name column intermediate said major columns, said sheet also comprising another fold line between the columns to enable the sheet to be folded to display said second name column and a major column to one face thereof, similarly-arranged columns upon the opposite face of the sheet with the fold lines lying between them, and extensions beyond major columns at each edge of the sheet to receive carbon copies of entries on the opposite faces of the sheet.

12. A ledger sheet for a printing and computing machine, but wider than the platen thereof, and comprising a face having a plurality of columns thereon representing the days of the week, a plurality of subsidiary columns under each day column, a name column adjacent one edge of the sheet, a name column intermediate the day columns, and fold lines between the columns and along which the sheet is adapted to be folded to a width to fit said platen, so that the first name column is visible together with a plurality of day columns when folded along one fold line, and when folded along another line, the other name column together with the remaining day columns and the significant part of the last one of the first-named day columns is visible.

13. A ledger sheet for a printing and computing machine, but wider than the platen thereof, and comprising a face having a plurality of columns thereon representing the days of the week, a plurality of subsidiary columns under each day column, a name column adjacent one edge of the sheet, a name column intermediate the day columns, fold lines along which the sheet is adapted to be folded to a width to fit said platen, so that the first name column is visible together with a plurality of day columns when folded along one fold line, and the other name column together with the remaining day columns and the significant part of the last one of the first-named day columns is visible when folded along another line, similar columns but differently placed on the opposite face of the sheet, said fold lines lying on lines between the columns on both faces of the sheet, and an extension at each end of the sheet adapted to be folded to receive a carbon copy of the entries in the last column.

14. A ledger sheet for a printing and computing machine, but wider than the platen thereof, and comprising a face having a plurality of columns thereon representing the days of the week, a plurality of subsidiary columns under each day column, a name column adjacent one edge of the sheet, a name column intermediate the day columns, fold lines along which the sheet is adapted to be folded to a width to fit said platen, so that the first name column is visible together with a plurality of day columns when folded along one fold line, and the other name column together with the remaining day columns and the significant part of the last one of the first-named day columns is visible when folded along another line, similar columns but differently placed on the opposite face of the sheet, said fold lines lying on lines between the columns, and an extension at each end of the sheet adapted to be folded to receive a carbon copy of the entries in the last column, said sheet formed to coöperate with a loose-leaf binder at one end adjacent one name column, and one extension being wider than the other to allow for the difference in length required by the end adapted to engage the loose-leaf binder.

15. A ledger sheet for a computing and printing machine, but wider than the platen thereof, and comprising a face having a name column near one edge, a plurality of amount columns also on said face, a name column and amount columns upon the opposite face, an extension adapted to be engaged by a binder, a foldable margin beyond said extension adapted to receive a copy of the amount column entries which are to be transferred from one face, and a foldable margin at the opposite edge of the sheet adapted to receive a copy of the amount column entries which are to be transferred from the other face.

16. A ledger sheet for a computing and printing machine, but wider than the platen thereof, and comprising a column for each day of the week on each face of the sheet, and a name column upon each face of the sheet, and comprising a fold line falling along a division between columns on a Wednesday on one face of the sheet, and upon a division line between other columns on the other face of the sheet to enable the sheet to be folded to a width to fit said platen.

17. A ledger sheet for a computing and printing machine, but wider than the platen thereof and comprising a column for each day of the week on each face of the sheet, and a name column upon each face of the sheet, and comprising a fold line falling along a division between columns on a Wednesday on one face of the sheet, and upon a division line between other columns on the other face of the sheet to enable the sheet to be folded to a width to fit said platen, and other fold lines falling between other columns to enable the sheet to be folded to selectively display various columns.

WENDELL P. KEENE.

Witnesses:
 CATHERINE A. NEWELL,
 JENNIE P. THORNE.